US007647343B2

(12) United States Patent
Yamamichi et al.

(10) Patent No.: US 7,647,343 B2
(45) Date of Patent: Jan. 12, 2010

(54) INFORMATION PRESENTATION SYSTEM, MANAGEMENT DEVICE, AND TERMINAL DEVICE

(75) Inventors: Masato Yamamichi, Ota (JP); Masami Yamamichi, legal representative, Ota (JP); Satomi Yamamichi, legal representative, Ota (JP); Keiko Yamamichi, legal representative, Maebashi (JP); Motoji Ohmori, Hirakata (JP); Masaya Yamamoto, Arcadia, CA (US); Kazuhisa Watanabe, Yokohama (JP); Atsushi Saso, Yokohama (JP); Naoaki Yamamoto, Tokyo (JP)

(73) Assignee: Panasonic Corporation, Osaka (JP)

( * ) Notice: Subject to any disclaimer, the term of this patent is extended or adjusted under 35 U.S.C. 154(b) by 282 days.

(21) Appl. No.: 10/557,197

(22) PCT Filed: Jun. 3, 2004

(86) PCT No.: PCT/JP2004/008085

§ 371 (c)(1),
(2), (4) Date: Nov. 17, 2005

(87) PCT Pub. No.: WO2004/109553

PCT Pub. Date: Dec. 16, 2004

(65) Prior Publication Data

US 2007/0198582 A1 Aug. 23, 2007

(30) Foreign Application Priority Data

Jun. 4, 2003 (JP) ............................. 2003-159387

(51) Int. Cl.
*G06F 17/30* (2006.01)

(52) U.S. Cl. ........................................ 707/104.1; 707/6

(58) Field of Classification Search ....................... None
See application file for complete search history.

(56) References Cited

U.S. PATENT DOCUMENTS 5,832,171 A * 11/1998 Heist .......................... 386/46

(Continued)

FOREIGN PATENT DOCUMENTS

EP            0 872 835          10/1998

(Continued)

OTHER PUBLICATIONS

Anonymous: "CATVids version 5", WWW.FNPRG.COM, 'Online! Apr. 2, 2003, pp. 1-8, Retrieved from the Internet: URL:http://web.archive.org/web/20030402004010/www.fnprg.com/catvids/catvids.html> 'retrieved on Sep. 22, 2004! Sections: "Overview", "Features", and "New Features in CATVids v5" (incl. Snapshots of main and "Contents data/Explore" windows)—the latter section available at the end of section "Version History".

(Continued)

*Primary Examiner*—Neveen Abel Jalil
*Assistant Examiner*—Son T Hoang
(74) *Attorney, Agent, or Firm*—Wenderoth, Lind & Ponack L.L.P.

(57) ABSTRACT

An information presentation system that simplifies entry of information relating to a package media of a user. The information presentation system includes a playback apparatus, a library information management apparatus, and a terminal apparatus. The playback apparatus reads an identifier identifying a content from a portable recording medium in which the content is recorded, and transmits the read identifier to the library information management apparatus via a network. The library information management apparatus receives the identifier, acquires attribute information, generates library information including the attribute information and the identifier, and stores the library information. Upon request by the terminal apparatus, the library information management apparatus generates presentation information based on the library information, and transmits the presentation information.

18 Claims, 14 Drawing Sheets

U.S. PATENT DOCUMENTS

| | | | |
|---|---|---|---|
| 5,979,757 A | 11/1999 | Tracy et al. | |
| 6,065,006 A | 5/2000 | deCarmo et al. | |
| 6,384,861 B1* | 5/2002 | Lindsey | 348/169 |
| 2002/0007457 A1* | 1/2002 | Neff | 713/180 |
| 2002/0023000 A1* | 2/2002 | Bollay | 705/14 |
| 2002/0059120 A1* | 5/2002 | Milton | 705/28 |
| 2002/0138379 A1* | 9/2002 | Yuasa et al. | 705/35 |
| 2002/0162112 A1* | 10/2002 | Javed | 725/87 |
| 2002/0165987 A1* | 11/2002 | Arisaka et al. | 709/246 |
| 2003/0140348 A1* | 7/2003 | Stewart | 725/101 |
| 2003/0236695 A1* | 12/2003 | Litwin, Jr. | 705/10 |

FOREIGN PATENT DOCUMENTS

| | | |
|---|---|---|
| EP | 1 079 387 | 2/2001 |
| WO | 00/54187 | 9/2000 |

OTHER PUBLICATIONS

Anonymous: "VideoList". WWW.WAKEFIELDSOFT. COM, 'Online!, Apr. 11, 2003, pp. 1-6, Retrieved from the Internet: URL:http://web.archive.org/web/20030411213107/http://www.wakefieldsoft.com/videolist/>.'retrieved on Dec. 9, 2004.

A. Asthana et al., "A Small Domain Communications System for Personalized Shopping Assistance", IEEE International Conference on Personal Wireless Communications, 1994, Bangalore, India, Aug. 18-19, 1994, New York, NY, USA, IEEE, Aug. 18, 1994, pp. 199-203.

* cited by examiner

FIG.5

| CONTENT ID | TITLE | TITLE IMAGE | RELATED INFORMATION | | | |
|---|---|---|---|---|---|---|
| | | | CAST | DIRECTOR | SCENARIO WRITER | ORIGINAL |
| 13 | TITLE B | ... | ○○○ | ×× | △△ | ○×○× |
| ... | ... | ... | ... | ... | ... | ... |

CONTENT LIST INFORMATION FOR "MOVIE"

CONTENT LIST IFNORMATION FOR "DRAMA"

CONTENT LIST INFORMATION FOR "SPORTS"

FIG.6

LIBRARY LIST INFORMATION FOR USER ID=XXXX

LIBRARY LIST INFORMATION FOR USER ID=0002

LIBRARY LIST INFORMATION FOR USER ID=0001

| CONTENT ID | RENTAL INFORMATION | OPEN/ PRIVATE | GENRE | TITLE | TITLE IMAGE | RELATED INFORMATION | DATE/TIME OF ENTERING |
|---|---|---|---|---|---|---|---|
| 1 | 0 | PRIVATE | DRAMA | TITLE A | | ... | 2002/4/1 10:00 |
| 13 | 1 | OPEN | MOVIE | TITLE B | | ... | 2002/6/1 22:00 |
| ... | ... | ... | ... | ... | ... | ... | ... |

FIG.7

| USER ID | PASSWORD | PRIVATE PASSWORD |
|---------|----------|------------------|
| 0001 | abcde | edcba |
| 0002 | fghij | klmno |
| ⋮ | ⋮ | ⋮ |

FIG.9

411 LIBRARY LIST INFORMATION ACQUISITION SERVICE
USER ID INPUT
[ ]
PASSWORD INPUT
[*****]
[OK]

412 SELECT INFORMATION TO BE ACQUIRED
[LIBRARY LIST]
[GENRE]
[SEARCH]
[OK]

413 INPUT TITLE
[ ]
[OK]

414 SELECT GENRE

| MOVIE | DRAMA |
| SPORTS | MUSIC |
| RENTAL | OTHERS |

[OK]

415 SEARCH RESULT
[ ]
HAS NOT BEEN ENTERED.

417 INPUT PRIVATE INFORMATION ACQUISITION PASSWORD
[*****]
[OK]

416 THERE IS PRIVATE INFOMRATION. DO YOU WISH TO AQUIRE THIS?
[YES] [NO]
[OK]

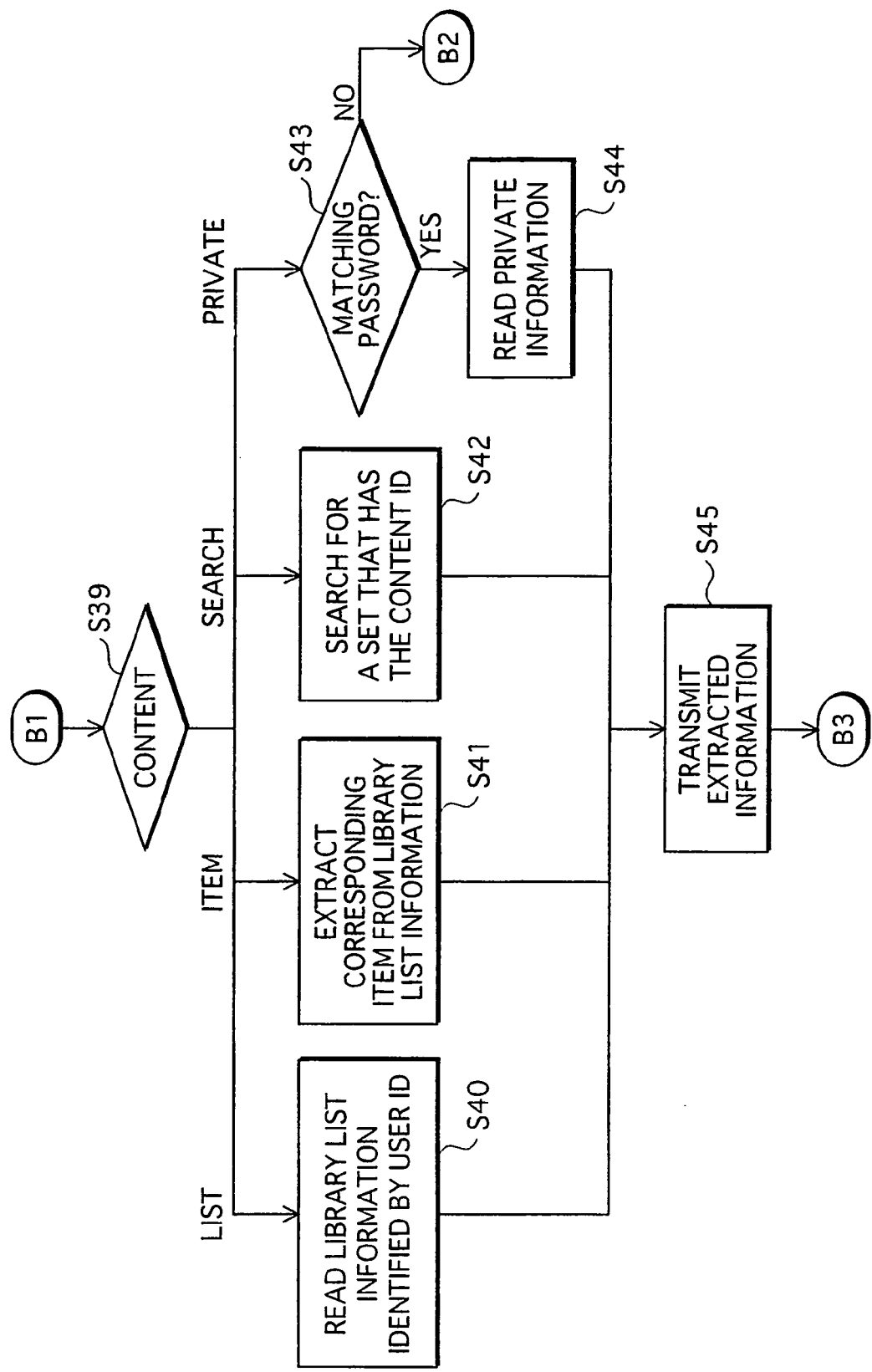

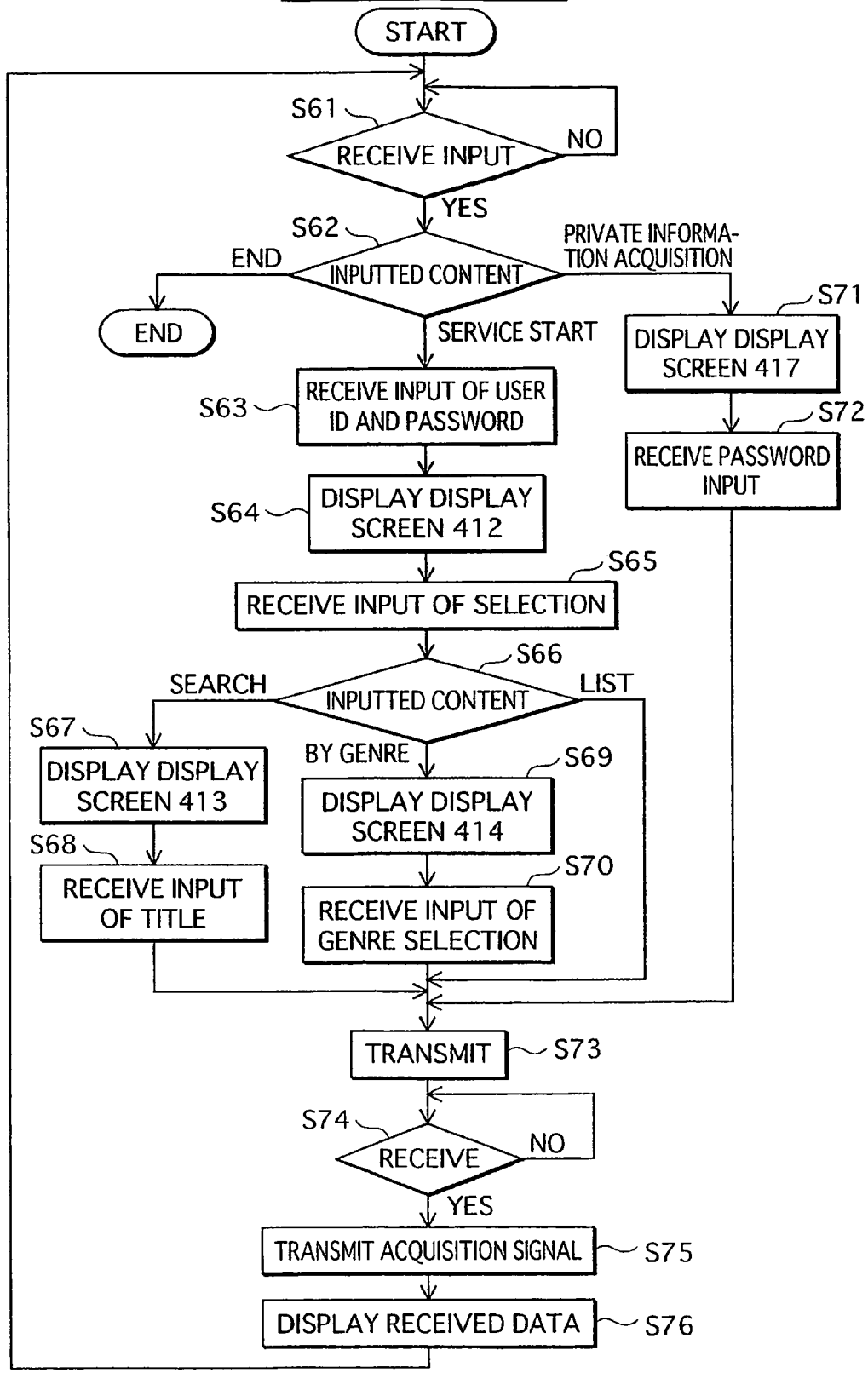

ND7343 B2

INFORMATION PRESENTATION SYSTEM, MANAGEMENT DEVICE, AND TERMINAL DEVICE

TECHNICAL FIELD

The present invention relates to a technology for generating a database.

BACKGROUND ART

Conventionally, when image materials containing photographed/recorded images and recorded audio are stored in videotape, a CD, a DVD, a BD (Blu-ray Disc), or the like, a database generating apparatus is used to generate an image-search database by inputting an image index for each image material, containing an identifier of the recording medium, a description of the recorded content, and a taking method thereof.

However with the mentioned apparatus, every time a new image material is stored, users have to input all the information relating to the image material so as to create an index. Such inputting takes an enormous amount of time, and it is not easy to generate indices. As a result, there is a problem that generation of an image-search database is also difficult.

In view of such a problem, as shown below, the patent reference 1 discloses a technology relating to a database generating apparatus and a database generating method, which enable easy generation of such a database.

Every time a portable external recording medium, which stores therein a part of the image data as index image data, is removably mounted to the mounting means of the database generating apparatus, the database generating apparatus generates index data for the image data, by playing back the index image data of the portable external recording medium. Index data is sequentially stored in a predetermined recording medium, and is compiled into a database from which stored image data can be retrieved. This enables easy generation of index data without necessitating input of description describing the content of the image data through a keyboard. This leads to easy generation of a database to search for images.

However, the aforementioned technology is for generating index data at the time when image data is photographed. Therefore it is impossible to generate a database for package media such as BD which general users own. In addition, there is a demand from the users that they wish to check the database when, for example, purchasing a package medium.

(patent reference 1)
Japanese patent publication No. 2001-216325

SUMMARY OF THE INVENTION

In view of the aforementioned problem, the object of the present invention is to provide an information presentation system, a management device, and an information presentation method, which enable users to easily access information relating to the package media of the users even away from home.

So as to achieve the above object, the present invention is an information presentation system including a using device, a management device, and a portable terminal device. The using device uses an object and transmits to the management device an object identifier identifying the object used by the using device. The management device receives and stores the object identifier, and generates presentation information based on the object identifier and according to a request from the terminal device, and outputs the generated presentation information. The terminal device requests the presentation information from the management device, and presents the presentation information.

With this technology, a user can use the presentation information without complicated operations. In addition, if carrying a terminal device with him, the user can access the information relating to the objects that the user has used, from any place such as away from home.

BRIEF DESCRIPTION OF THE DRAWINGS

FIG. 5 is a diagram showing the structure of content list information.

FIG. 6 is a diagram showing the structure of library list information.

FIG. 7 is a diagram showing user information.

FIG. 9 is a diagram showing input screens displayed to a display unit 406 of the portable telephone.

FIG. 13 is a flowchart showing operations performed by the library information management apparatus, which is a continuation from FIG. 12.

FIG. 14 is a flowchart showing operations performed by the portable telephone.

DETAILED DESCRIPTION OF THE INVENTION

The following describes, in detail, a library information management system as an embodiment of the present invention, with use of the drawings.

1. LIBRARY INFORMATION MANAGEMENT SYSTEM

Figure 1:
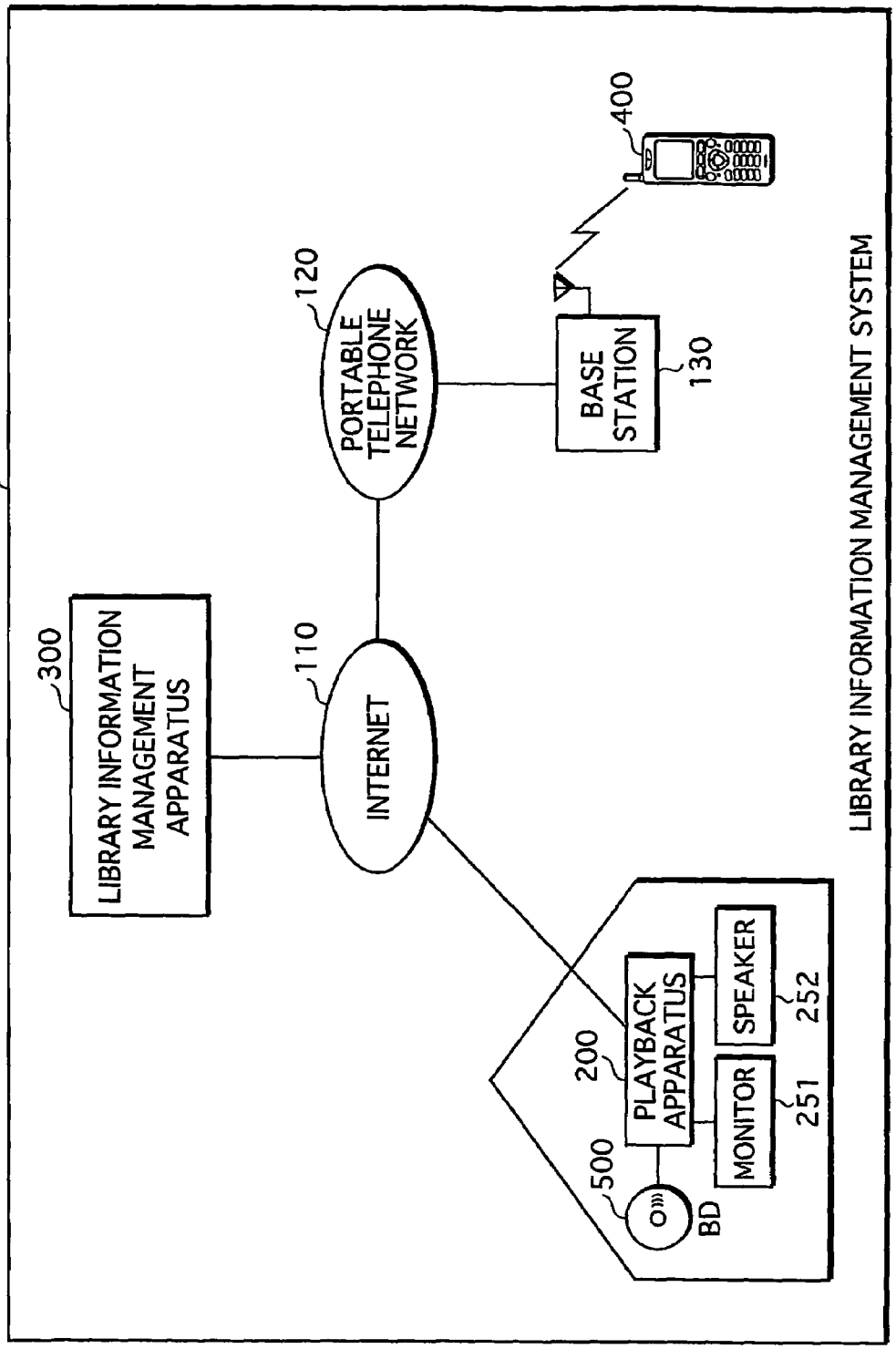
FIG. 1 is a block diagram showing the entire structure of a library information management system.

As FIG. 1 shows, the library information management system 100 is made up of a playback apparatus 200, a library information management apparatus 300, and a portable telephone 400. The playback apparatus 200 plays back a content. The library information management system 100 enters information relating to the content played back, in the library information management apparatus 300, thereby managing the information. The entry information is accessible through the portable telephone 400.

The playback apparatus 200 is located in a house where a user lives. A monitor 251 and a speaker 252 are connected to the playback apparatus 200. The playback apparatus 200 plays back the content recorded on a BD 500 which the user has purchased. The playback apparatus 200 is connected to the Internet 110, and transmits information relating to the content played back, to the library information management apparatus 300 via the Internet 110.

The library information management apparatus 300 is connected to the Internet 110, and generates chargeable library list information for each user according to the data received from the playback apparatus 200, and manages the library list information. According to this, a library information management agent provides a library information management service for managing the library list information.

The portable telephone 400 owned by the user acquires and displays information relating to the library list information, according to a user input. The library list information is acquired from the library information management apparatus 300, and via a base station 130, a portable telephone network 120, and the Internet 110. Use of this portable telephone 400 enables the user to access the library list information away from home.

1.1 Structure of Playback Apparatus

Figure 2:
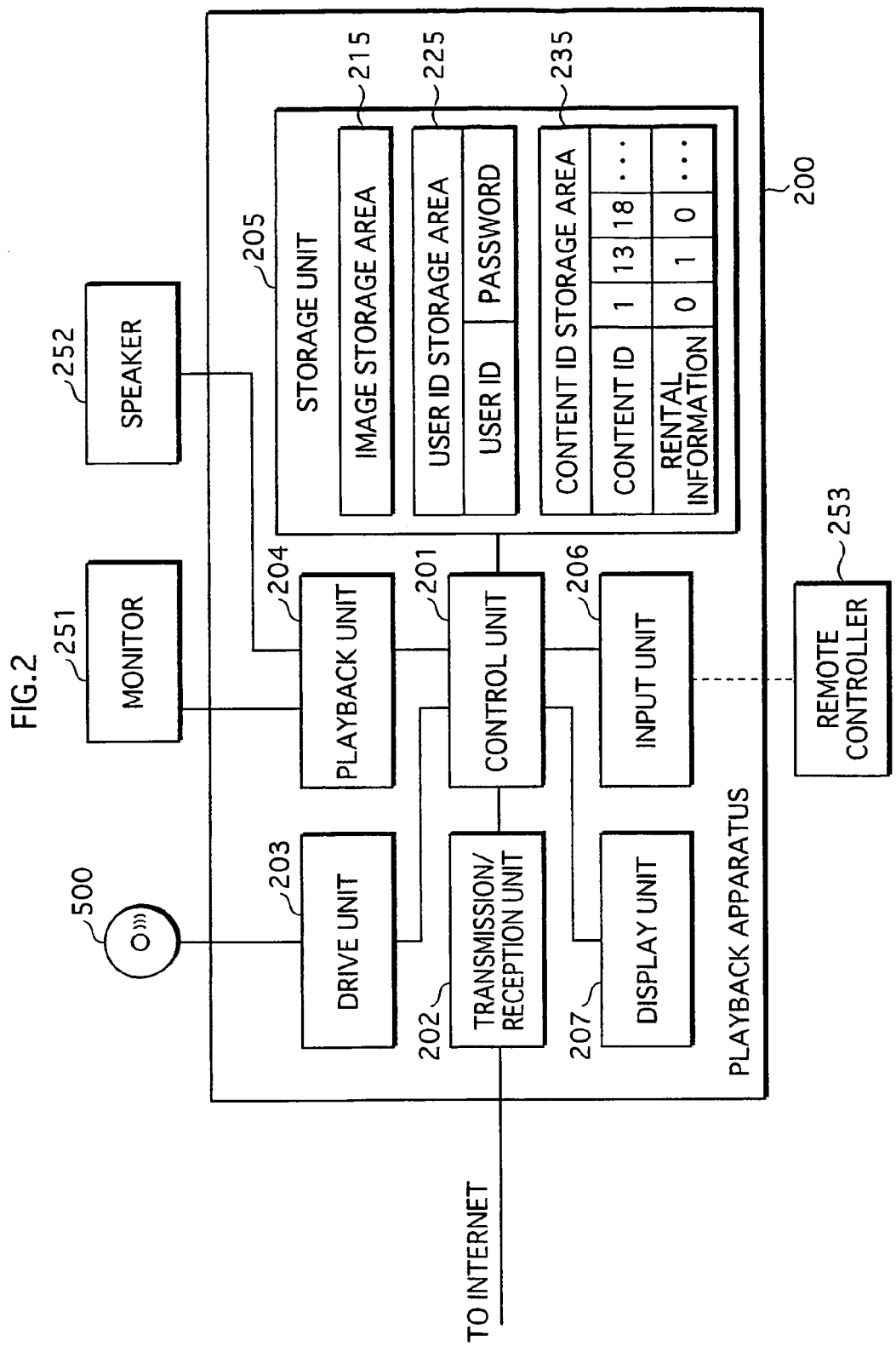
FIG. 2 is a block diagram showing the structure of a playback apparatus.

As FIG. 2 shows, the playback apparatus 200 is made up of a control unit 201, a transmission/reception unit 202, a drive unit 203, a playback unit 204, a storage unit 205, an input unit 206, and a display unit 207.

Specifically, the playback apparatus 200 is a computer system made up of a microprocessor, a ROM, a RAM, a hard disk unit, or the like. The RAM or the hard disk unit stores therein a computer program. The playback apparatus 200 accomplishes its function by the microprocessor operating according to the computer program.

(1) Storage Unit

The storage unit 205 has an image storage area 215, a user ID storage area 225, and a content ID storage area 235.

The user ID storage area 225 is for storing therein user IDs and passwords. A user ID and a password of the user are registered in the library information management apparatus 300 when the user makes a contract with the library information management agent. The user ID and the password are first received by the input unit 206, then stored. A user ID is an identifier unique to a user, and is stored in association with a password.

Figure 3:
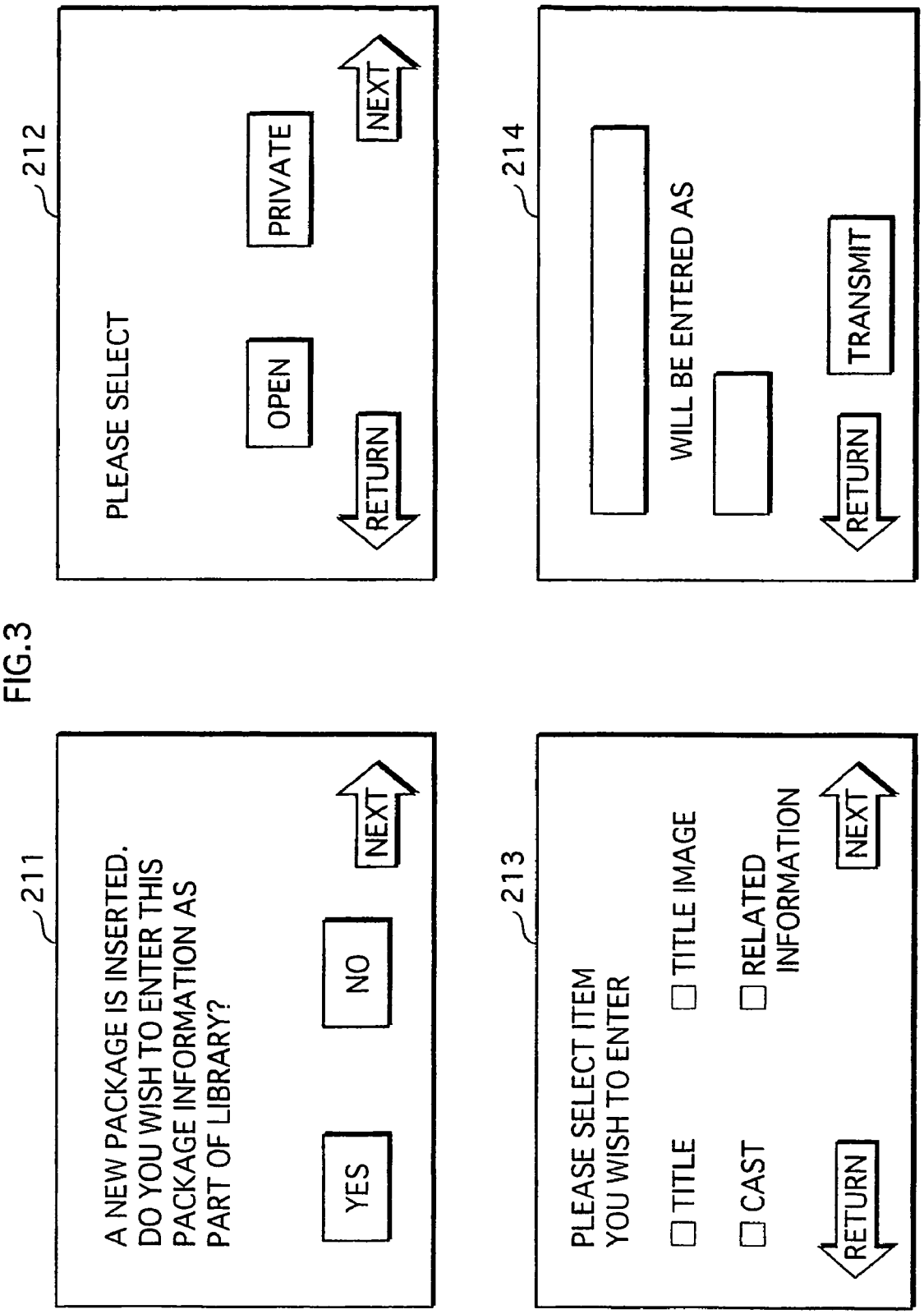
FIG. 3 is a diagram showing display screens displayed to a monitor.

The image storage area 215 stores image data for displaying the input screens 211, 212, 213, and 214 that are shown in FIG. 3. In reality, the image data is stored as electronic data, however FIG. 3 depicts screens to be displayed at the monitor 251. The input screen 211 is for making an inquiry to the user about whether to enter, in the library list information, the content recorded on the BD 500 mounted to the playback apparatus 200, either i) when the content on the BD 500 has not yet been entered in the library list information, or ii) when the BD 500 is not for rent but contains the same content having already entered as a rental content. The input screen 212 is for selecting whether the content should be entered as open information or private information. Here, open information is available with use of the above-mentioned user ID and password, whereas private information is only available with use of another password that is private and is different from the above-mentioned password. The input screen 213 is for selecting items that the user wants to enter. The items relate to information to be entered in the library list information. The items are: title, title image, cast, and presentation information. The selected items will be entered in the library list information. The input screen 214 displays the package title, and whether open/private, thereby making an inquiry about whether the inputted information can be transmitted to the library information management apparatus 300.

The content ID storage area 235 is for storing content IDs and rental information, in association. A content ID is an identifier unique to a content recorded on the BD 500. Content IDs stored in the content ID storage area 235 are of contents entered in the library information management apparatus 300 as library information. Rental information is a flag showing whether the entered content ID is of a rental content or not. For a rental content, "1" is stored in association with the content ID, and for a content not rented, "0" is stored in association with the content ID.

(2) Drive Unit

The drive unit 203 reads a content ID and rental information from the BD 500, and outputs them to the control unit 201. In addition, by being controlled by the control unit 201, the drive unit 203 reads a content recorded on the BD 500, and outputs the content to the playback unit 204.

(3) Playback Unit

The playback unit 204 is connected to the monitor 251 and to the speaker 252. By being controlled by the control unit 201, the playback unit 204 receives the content that the drive unit 203 has read from the BD 500, generates an image signal from the received content, outputs the generated image signal to the monitor 251, generates an audio signal from the received contents, and outputs the generated audio signal to the speaker 252.

(4) Input Unit

The input unit 206 receives an input signal transmitted from a remote controller 253 according to a user operation, and outputs the received signal to the control unit 201.

(5) Control Unit

The control unit 201, when the BD 500 is inserted thereto, controls the drive unit 203, and reads the content ID and the rental information of the content recorded on the BD 500. The control unit 201 then judges whether the read ID has been stored in the content ID storage area 235, and when judging negatively, displays the input screen 211 of FIG. 3 to the monitor 251. When judging affirmatively, the control unit 201 compares the corresponding rental information stored in the content ID storage area 235, with the rental information just been read. When the stored rental information is "1" and the read rental information is "0", the control unit 201 displays the input screen 211 of FIG. 3, to the monitor 251, so as to update the rental information of the library list information. The control unit 201 does not perform any entering operation 1) when the stored rental information is "1" and the read rental information is "1", or 2) when the stored rental information is "0".

After display of the input screen 211 and when receiving input of "YES" and "NEXT" via the input unit 206, the control unit 201 displays the input screen 212. When either "open" or "private", and "next" are selected, the input screen 213 is displayed. When one of the alternatives in the input screen 213 and "next" are selected, the input screen 214 together with the title and the "open" or "private" are displayed. When "transmission" is selected, the control unit 201 reads the user ID and the password from the storage unit 205. Then the control unit 201 transmits, as entry information, the user ID and the password, the content ID and the rental information read from the BD 500, and the inputted information, to the library information management apparatus 300 via the transmission/reception unit 202.

After display of the input screen 211 and when receiving "NO" and "NEXT" via the input unit 206, the control unit 201 ends the entering operation.

The control unit 201, when receiving from the input unit 206 an input indicating to play back the content, controls the drive unit 203 to read a content from the BD 500, and plays back the read content by controlling the playback unit 204.

1.2 Structure of Library Information Management Apparatus

Figure 4:
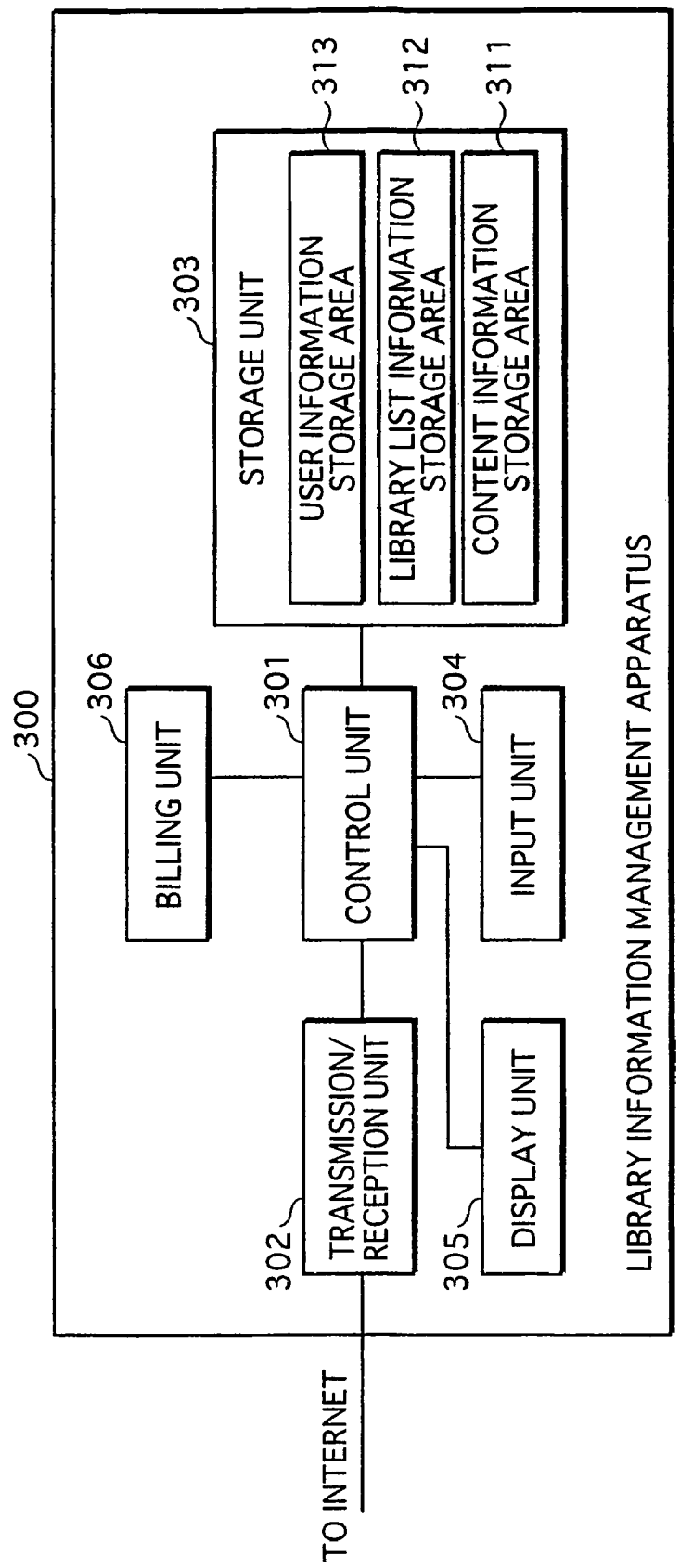
FIG. 4 is a block diagram showing the structure of a library information management apparatus.

The library information management apparatus 300 manages information relating to a content transmitted from the playback apparatus 200, as library list information. As FIG. 4 shows, the library information management apparatus 300 is made up of a control unit 301, a transmission/reception unit 302, a storage unit 303, an input unit 304, a display unit 305, and a billing unit 306.

Specifically, the library information management apparatus 300 is a computer system made up of a microprocessor, a ROM, a RAM, a hard disk unit, or the like. The RAM or the hard disk unit stores therein a computer program. The library information management apparatus 300 accomplishes its function by the microprocessor operating according to the computer program.

(1) Storage Unit

The storage unit 303 has a content information storage area 311, a library list information storage area 312, and a user information storage area 313.

(a) Content Information Storage Area

The content information storage area 311 is for storing content list information inputted from an external source via the input unit 304. As FIG. 5 shows, the content list information is grouped under genres such as movie, drama, and sports.

Each group of content list information is made up of sets of content information, in a number corresponding to the number of contents having been entered, where each of the sets of content information is made up of content ID, title, title image, and presentation information.

A content ID is an identifier unique to each content. A title is a name of a content identified by the corresponding content ID. For example, a title image is an image on the jacket of the recording medium recording therein the content, or an image representative of the content. Presentation information is information entered according to the genre of the content. For example, if the content genre is movie, the presentation information will be information relating to the cast, information relating to the director or the scenario writer of the movie, and information relating to the original of the movie.

(b) Library List Information Storage Area

The library list information storage area 312 is for storing the library list information. As FIG. 6 shows, the library list information is grouped under user ID, and there are groups of library list information in the same number as the number of users having made a contract for receiving the library providing service.

Each group of library list information is identified by a user ID. Each group of library list information contains sets of library information in the number registered by the user, each set of library information containing items of: content ID, rental information, open/private, genre, title, title image, presentation information, and entry date/time.

"open/private" item shows whether the content identified by the content ID has been entered as open information or private information.

Items of "title", "title image", and "presentation information" are written by reading the corresponding items from the content information that is identified by the content ID contained in the entry information. Under the items that are not included in the entry information, information indicating there is no corresponding information is written. The genre is an area for writing the genre of the content list information, from which the title, the title image, and the presentation information have just been read. The entry date/time is an area for writing the date/time at which the entry information received from the playback apparatus is entered in library list information.

(c) User Information Storage Area

The user information storage area 313 is an area for storing user information, which is to be registered when a user makes a contract with the library information management agent. The user information is made up of sets in each of which user ID, password, and private password are associated with each other, in the same number as the number of the user having a contract with the library information management agent. A private password is used for reading private information.

(2) Billing Unit

The billing unit 306, by being controlled by the control unit 301, charges the portable telephone 400 for the amount corresponding to the transmitted information.

(3) Control unit

The control unit 301 transmits/receives data via the transmission/reception unit 302. Hereinafter, the expressions "transmit" and "receive" mean to perform transmission/reception via the transmission/reception unit 302.

The control unit 301, receives entry information or acquisition request information indicating acquisition of information relating to the library list information either from the playback apparatus 200 or from the portable telephone 400, then judges whether the user information storage area 313 has a set of user information whose user ID and password match those included in the received information. If there is no such set of user information, the control unit 301 returns acquisition rejection information indicating that the acquisition cannot be allowed.

When receiving entry information from the playback apparatus 200 and judging that there is a matching set of user information, the control unit 301 judges whether the library list information identified by the user ID of the received entry information has a content ID that is identical to the content ID included in the entry information. If judging affirmatively, the control unit 301 judges that the case is for updating, and when judging negatively, judges that the case is for new entering. When judging that the case is for updating, the control unit 301 updates the rental information of the library information identified by the received content ID, among the library list information identified by the user ID included in the received entry information. When judging that the case is for new entering, the control unit 301 writes, in the library list information identified by the received user ID as new library information, the content ID, the rental information, and open/private information, which have been received as the entry information. In addition, the control unit 301 reads the content information identified by the received content ID, from the content list information, and extracts, from the read content information, the items corresponding to the items received as the entry information, and writes the information about the extracted items to the set whose content ID matches. Information indicating that there is no corresponding information is written to the items not selected by the user.

The control unit 301 receives acquisition request information from the portable telephone 400, and when judging that there is a matching set of the user information, performs operation according to the content of the acquisition request information.

When the acquisition request information indicates acquisition of library list information, the control unit 301 reads the library list information identified by the received user ID.

When the library list information contains private information, the control unit 301 extracts only the open information, and transmits the extracted open information and information indicating that there is private information, as a result, to the portable telephone 400.

When the acquisition request information indicates genre, the control unit 301 extracts the library information of the genre shown by the acquisition request information, from the library list information identified by the received user ID. When the extracted library information contains private information, the control unit 301 extracts only the open information from the extracted library information, and transmits the extracted open information, and information indicating that there is private information, as a result, to the portable telephone 400.

When the acquisition request information indicates search, the control unit 301 searches the library list information identified by the received user ID, for the library information whose title matches that of the content included in the acquisition request information.

When the acquisition request information indicates acquisition of private information, the control unit 301 judges whether the private password acquired together with the acquisition request information matches the private password corresponding to the received user ID, in the user information storage area 313. When judging negatively, the control unit 301 returns acquisition rejection information indicating that the acquisition cannot be allowed. When judging affirmatively, the control unit 301 extracts the private information from the library list information identified by the user ID, and transmits it to the portable telephone 400.

In addition, the control unit 301, when receiving an acquisition signal indicating that the result has been acquired, controls the billing unit 306 to perform billing.

1.3 Structure of Portable Telephone

Figure 8:
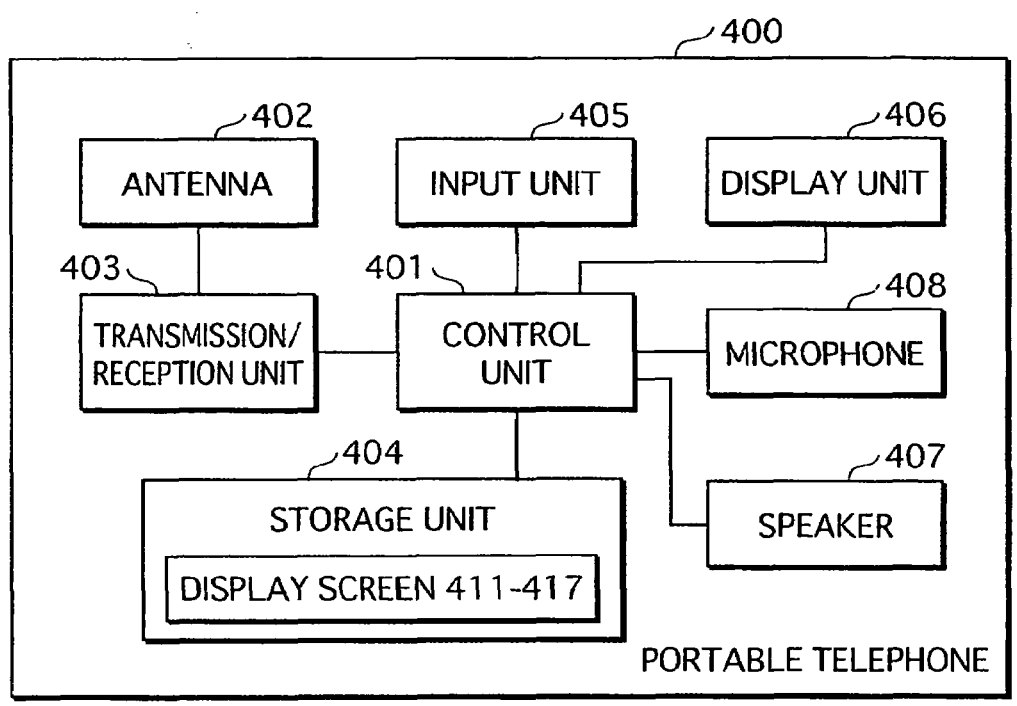
FIG. 8 is a diagram showing the structure of a portable telephone.

As FIG. 8 shows, the portable telephone 400 is made up of a control unit 401, an antenna 402, a transmission/reception unit 403, a storage unit 404, an input unit 405, a display unit 406, a speaker 407, and a microphone 408. The portable telephone is a computer system similar to the playback apparatus 200, and accomplishes its function by its microprocessor operating according to the computer program stored in the RAM or the hard disk unit that are included therein.

(1) Storage Unit

The storage unit 404 stores image data for displaying the display screens 411-417 which are shown in FIG. 9. In reality, the image data is stored as electronic data. However FIG. 9 illustrates the screens to be displayed at the display unit 406, to simplify explanation.

The display screen 411 is to be displayed when the start of the library list information acquisition service is selected through the input unit 405, which means the use of the library list information. The display screen 411 has an area for receiving input of a user ID and a password.

The display screen 412 is for receiving selection of information to be acquired, and is composed of "library list information", "genre", and "search". "Library list information" indicates acquiring all the open information from among the library list information. "Genre" indicates acquisition of only the library information of the selected genre. "Search" indicates performing search to see whether the library information has entry of a particular content.

The display screen 413 is displayed when "search" is selected in the display screen 412, and has an area for inputting the title of the content that the user wishes to search for.

The display screen 414 is displayed when "genre" is selected, and is for receiving selection of genre. "Genre" is composed of "movie", "drama", "sports", "music", "rental", and "others". Among them, "movie", "drama", "sports", "music" respectively correspond to each genre of the content list information of the library information management apparatus. Selection of one of them indicates acquisition of sets categorized in the genre from the library list information. "Others" indicates acquisition of sets that cannot be categorized in any of "movie", "drama", "sports", and "music". "Rental" indicates acquisition of sets having been entered as rental in the library list information.

The display screen 415 is for displaying a search result. It specifically displays whether the content of the found title has been entered or not.

The display screen 416 is for, when there is private information in the library list information or in the selected genre, receiving selection as to whether to acquire the private information, and is displayed together with the result of the library list information or of the genre.

The display screen 417 is for, when the acquisition of the private information is selected, receiving input of a private password.

Please note that it is alternatively possible to store audio data that corresponds to these display screens, and to present the mentioned information through audio.

(2) Control Unit

The control unit 401, when receiving an input for starting the library list information acquisition service via the input unit 405, displays the display screen 411 at the display unit 406. The control unit 401 receives an input of a user ID and a password. When "OK" is selected, the control unit 401 displays the display screen 412. When the library list information is selected at the display screen 412, the control unit 401 transmits, as acquisition request information, the user ID and the password to the library information management apparatus 300, via the transmission/reception unit 403 and the antenna 402. Please note that when the expression "the control unit 401 transmits", is hereinafter used, this means that the transmission is performed via the transmission/reception unit 403 and the antenna 402. This applies to the case of reception too.

When "search" is selected at the display screen 412, the control unit 401 receives an input of title at the screen 413, and transmits the user ID, the password, and the title, as acquisition request information, to the library information management apparatus 300.

When "genre" is selected at the display screen 412, the control unit 401 receives an input of genre at the display screen 414, and transmits the user ID, the password, and the genre whose selection has been received, as acquisition request information, to the library information management apparatus 300.

When receiving a search result, the control unit 401 controls the display unit 406 to display the title found by the search, by superimposing it on the display screen 415. When receiving information indicating there is private information, together with the result of the library list information or of the genre, the control unit 401 displays the display screen 46. In addition, when receiving an input of acquisition of the private information after the display screen 416 is displayed, the control unit 401 displays the display screen 417 at the display unit 406, receives an input of a private password, and transmits acquisition request information that contains the private password and indicates acquisition of the private information, to the library information management apparatus 300. Further, when receiving the result of the private information acquisition, the control unit 401 displays it to the display unit 406.

When receiving the result, the control unit 401 transmits an acquisition signal indicating that it received the result, to the library information management apparatus 300.

1.4 Operation of Playback Apparatus

Figure 10:
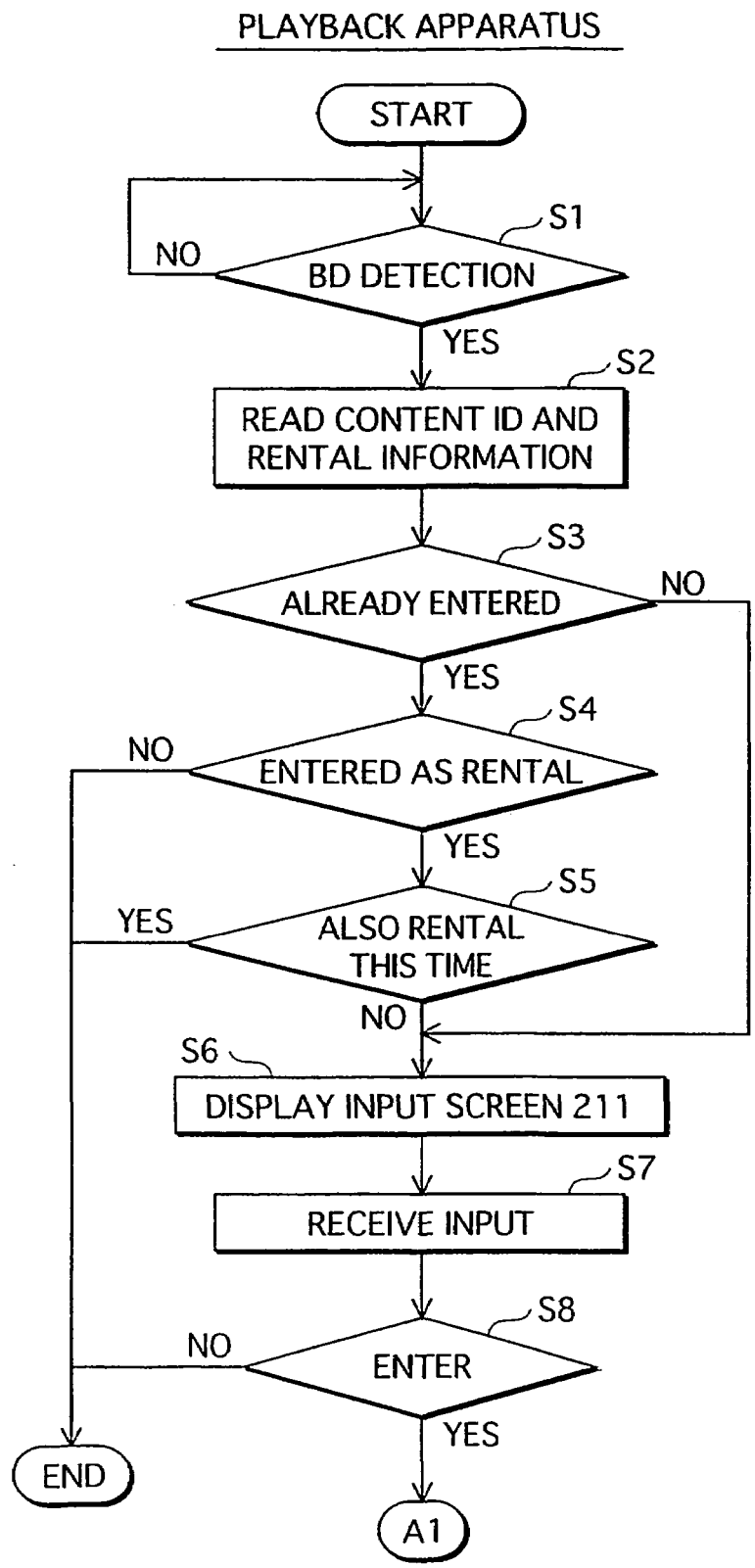
FIG. 10 is a flowchart showing entering operations performed by the playback apparatus, which continues to FIG. 11.
Figure 11:
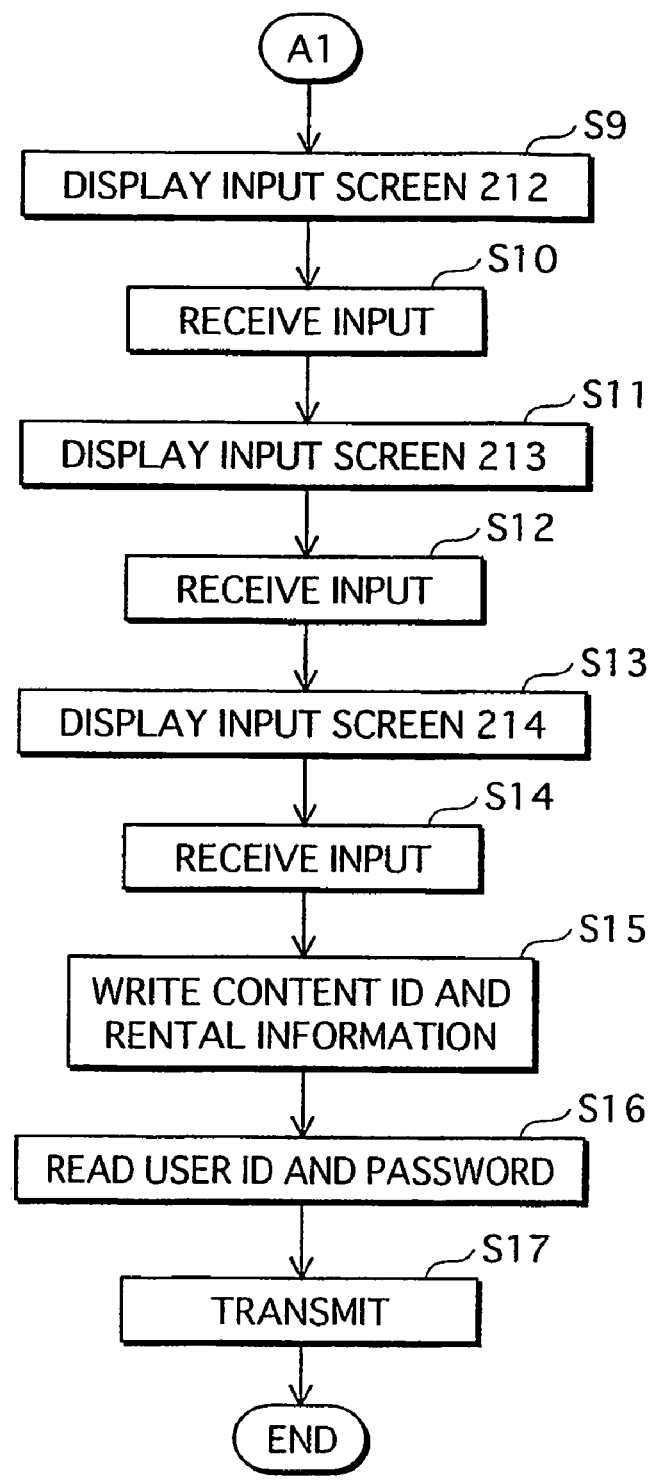
FIG. 11 is a flowchart showing entering operations performed by the playback apparatus, which is a continuation from FIG. 10.

The following describes the operation performed by the playback apparatus 200 in entering a content ID to the library list information, with use of FIGS. 10, and 11.

The control unit 201 of the playback apparatus 200 judges whether it has detected the BD 500 (Step S1). When judging negatively (Step S1: NO), the control unit 201 waits until detection of the BD 500.

When it is judged that the BD 500 has been detected (Step S1: YES), the control unit 201 controls the drive unit 203 to read the content ID and the rental information from the BD 500 (Step S2). The control unit 201 then judges whether the read content ID has already been stored in the storage unit 205 (Step S3). When the content ID is judged not to have been stored (Step S3: NO), the control unit 201 displays the input screen 211 to the monitor 251 (Step S6).

When the read content ID is judged to have been already stored (Step S3: YES), then the control unit 201 judges whether the stored content ID is stored as rental (Step S4). When it is stored not as rental (Step S4: NO), then the entering operation is ended.

When the stored content ID is stored as rental (Step S4: YES), the control unit 201 judges whether the rental information having been just read indicates rental or not (Step S5). When it indicates rental, the entering operation is ended.

When the stored content ID is judged not to have been stored as rental (Step S5: NO), the control unit 201 displays the input screen 211 to the monitor 251 (Step S6).

After the input screen 211 is displayed, the control unit 201 receives an input from a user by operation through the remote controller 253 (Step S7), and judges whether the received input indicates entering or not (Step S8). If the input is judged not to indicate entering, the entering operation is ended there.

If the input is judged to indicate entering, the control unit 201 displays the input screen 212 (Step S9). When receiving an input as to whether the content ID should be entered as open or private (Step S10), the control unit 201 displays the input screen 213 (Step S11), and receives a selection of item (Step S12). Next, the input screen 214 is displayed (Step S13). When an input of confirmation is received (Step S14), the control unit 201 writes the content ID and the rental information in association, to the content ID storage area (Step S15). In addition, the control unit 201 reads the user ID and the password from the storage unit 205 (Step S16), and transmits the content ID, the rental information, the data whose input has been received, and the user ID and the password having been read, as entry information (Step S17).

1.5 Operation of Library Information Management Apparatus

Figure 12:
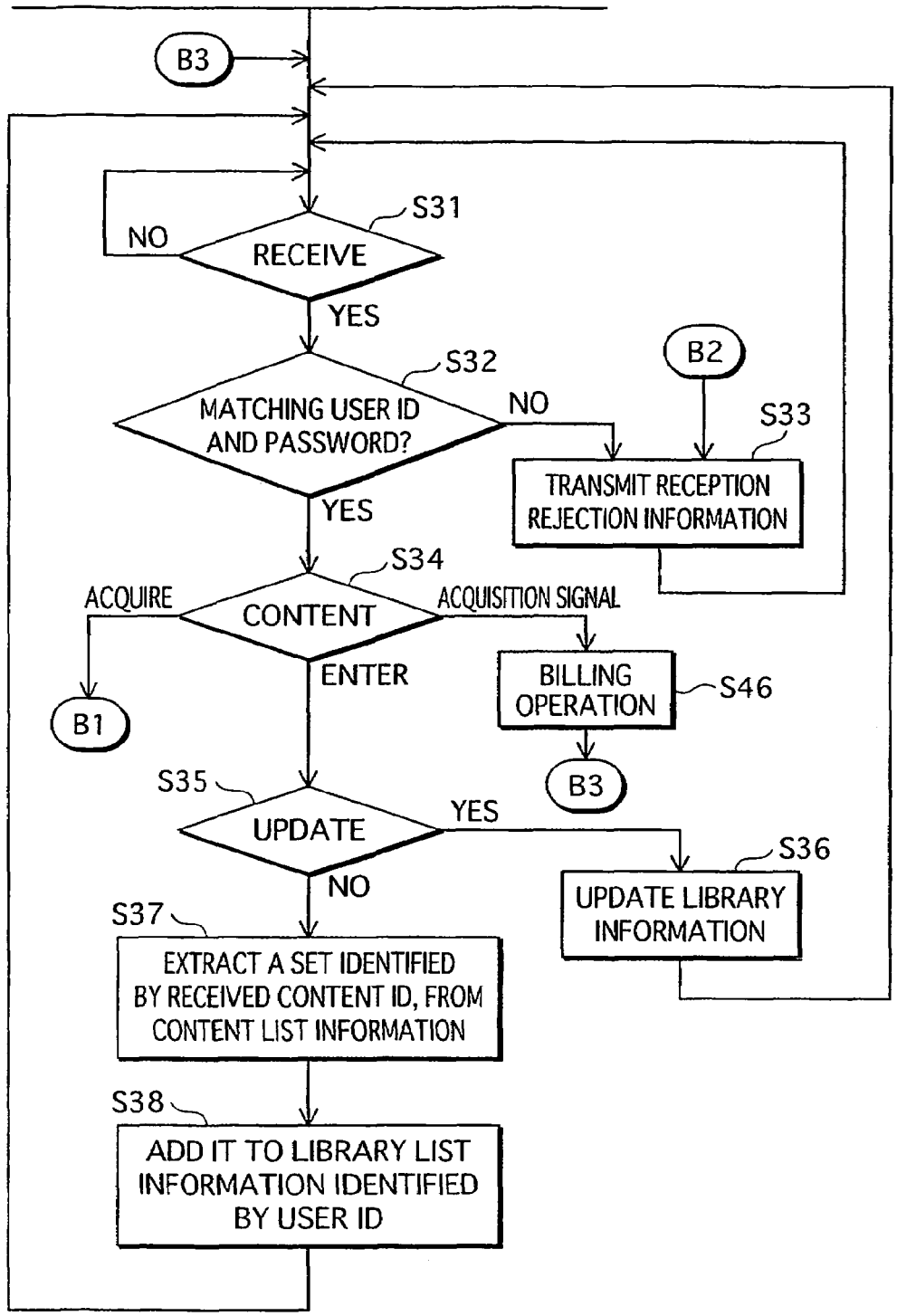
FIG. 12 is a flowchart showing operations performed by the library information management apparatus, which continues to FIG. 13.

The following describes the operation performed by the library information management apparatus 300, with use of FIGS. 12 and 13.

The control unit 301 detects whether data has been received (Step S31). When data has not been received, the control unit 301 waits until data is received. When receiving data (Step S31: YES), the control unit 301 judges whether the user information storage area 313 has a set of user information whose user ID and password match the user ID and the password that have been just received (Step S32). When there is no such matching set of user information, the control unit 301 returns an acquisition rejection (Step S33), and waits until receiving data again. When there is a matching set of user information (Step S32: YES), the control unit 301 judges whether the received data indicates entering or acquisition (Step S34). When the data indicates entering, the control unit 301 then judges whether it indicates updating or not (Step S35). When it indicates updating, the control unit 301 updates the library information identified by the received content ID, which is among the library list information identified by the received user ID (Step S36). When the updating operation ends, the control unit 301 waits until detecting another reception.

When the data does not indicate updating (Step S35: NO), the control unit 301 extracts the set identified by the received content ID (Step S37), extracts, from the extracted set, the item that corresponds to the received item, generates library information using the received information included in the entry information and the other information in the extracted set, and adds the generated library information to the library list information identified by the received user ID (Step S38). After the operation has ended, the control unit 301 waits until detecting another reception.

When the received content indicates acquisition request information (Step S34: YES), the control unit 301 interprets the request content (Step S39). If the request content indicates reading of the library list information, the control unit 301 reads the open information from the library list information identified by the received user ID (Step S40), and transmits it (Step S45). When the request content indicates genre, the control unit 301 extracts sets whose genre matches the received genre, from among the open information included in the library list information identified by the received user ID (Step S41), and transmits the extracted sets (Step S45). When the request content indicates search, the control unit 301 performs search in the library list information identified by the received user ID, for a set whose title matches the received title (Step S42), and transmits the search result (Step S45). When the request content indicates acquisition of private information, the control unit 301 judges whether the received private password matches the password that is associated with the user ID in the set of user information (Step S43), and when they do not match (Step S43: NO), the control unit 301 transmits an acquisition rejection (Step S33). When they match (Step S43: YES), the control unit 301 extracts the sets of private information from among the library list information (Step S44), and transmits the sets (Step S45).

After the sets have been transmitted, the control unit 301 waits until detecting another reception again.

When the received content is an acquisition signal (Step S34: acquisition signal), the control unit 301 performs billing operation (Step S46), and waits until detecting another reception.

1.6 Operation of Portable Telephone

The following describes the operation of using the library list information through the portable telephone 400, with use of FIG. 14.

The control unit 401 detects whether an input has been received (Step S61). When an input has not been received (Step S61: NO), the control unit 401 waits until receiving an input.

When an input has been received (Step S61: YES), the control unit 401 interprets the inputted content (Step S62). When the inputted content indicates ending, the control unit 401 ends the operation.

When the inputted content indicates start of library list information acquisition service, the control unit 401 displays the display screen 411 of FIG. 9 to the display unit 406, and receives an input of user ID and password (Step S63). The control unit 401 then displays the display screen 412 to the display unit 406 (Step S64), and receives an input through user selection (Step S65). Then the received inputted content is interpreted (Step S66), and when the inputted content indicates search, the control unit 401 displays the display screen 413 (Step S67), and receives an input of title (Step S68), then transmits the received title, the user ID and the password, as acquisition request information, to the library information management apparatus 300 (Step S73). When the inputted content indicates genre, the control unit 401 displays the display screen 414 (Step S69), receives an input through user selection (Step S70), and transmits the selected genre, the user ID and the password, as acquisition request information, to the library information management apparatus 300 (Step S73). When the inputted content indicates acquisition of the library list information, the control unit 401 transmits the user ID and the password, as acquisition request information, to the library information management apparatus 300 (Step S73).

When the inputted content at Step S62 indicates acquisition of private information, the control unit 401 displays the display screen 417 (Step S71), receives an input of private password (Step S72), and transmits the inputted private password, the user ID, and an acquisition request of private information, to the library information management apparatus 300 (Step S73).

After the information transmission, the control unit 401 detects whether a result is received from the library information management apparatus 300 (Step S74). When the result has not been received, the control unit 401 waits until reception. When the result has been received, the control unit 401 transmits an acquisition signal to the library information management apparatus 300 (Step S75), displays the received result to the display unit 406 (Step S76), and waits until detecting another input.

2. OTHER MODIFICATION EXAMPLES

So far, the present invention has been described based on the above embodiments. However needless to say, the present invention should not be limited to the above-described embodiments, and may include the following cases.

(1) The present embodiment is designated to select items, when entering a content from the playback apparatus to the library list information, and library information is generated for the selected items by the library information management apparatus. However alternatively, the library information management apparatus may designate such items in advance, so that selection becomes unnecessary at the time of entry. Still further, it is also possible that a user can select items to be entered when making a contract, so that library information will be generated for the already selected items, at the time when the playback apparatus performs entering.

(2) In the present embodiment, a portable telephone is used to acquire library list information. However, a PDA (personal digital assistant) or another communication device that is portable may be alternatively used for acquiring library list information.

Further, another arrangement is also possible: a terminal apparatus is located in a shop, and a user inputs the user ID and the password, so as to use the library list information.

(3) In the present embodiment, the billing is performed when library list information is accessed. However, it is possible to charge for the service when new library information is entered in the library list information, or to charge according to the amount of information entered, or according to the amount of information accessed. Further, the billing may be performed at regular intervals and on a fixed-price basis specified in advance.

(4) The following is an application example of the present invention.

The library information management apparatus may transmit library list information to a portable telephone, along with related commodity information such as a CM. Here, related commodity information is on goods, discount information, sequel information, recommended contents, or the like, which are related to the contents entered in the library list information.

(5) In addition, the portable telephone may transmit the current position information to the library information management apparatus, so that the apparatus may provide information service relating to the received position information.

One example of such is to notify a shop located within a certain distance from where the position information identifies, the shop selling goods and sequel contents which relate to the contents entered in the library list information.

(6) The present embodiment is designed to generate library list information within the library information management apparatus. However, the following designing is also possible.

When the BD is played back on the playback apparatus, the user mounts a memory card to the playback apparatus. The playback apparatus then writes the content ID from the BD to the memory card.

The user mounts the memory card recording therein the content ID, to a communication terminal such as a portable telephone. The memory card then acquires content information from the library information management apparatus via the communication terminal, and generates library list information.

By doing so, the user can use the library list information recorded in the memory card.

Alternatively, the following designing is also possible. The playback apparatus records a content ID in the memory card. The memory card acquires content information from the library information management apparatus via the playback apparatus connected to a network, thereby generating library list information.

Still further, it is also possible that a portable telephone equipped with the same function as that included in the memory card generates library list information. In such a case, the portable telephone may acquire a content ID by performing either wired/wireless communication with the playback apparatus. The portable telephone then acquires the content information corresponding to the acquired content ID, from the library information management apparatus, thereby generating library list information.

Also in case when the memory card or the portable telephone is used, the billing may be performed either when information is entered, or when information is used as described above. Further, the billing may be performed according to amount, or on a fixed-price basis.

(7) In the present embodiment, a content to be entered has been recorded in a BD. However, the content may be recorded in a DVD or a CD. Other recording media will be alternatively used too. In addition, the content may be already recorded in a recording medium at the time when the user purchases this content. Alternatively, the content may be acquired through a network after the purchase, or may be a broadcast program having been received. In addition, the number of contents recorded in a BD may be plural.

In addition, when library list information is generated for such objects as recording media, books, foods, and sundry articles, the following arrangements may be made.

That is, each object will be assigned a RFID (radio frequency identification) tag. In this RFID tag, an object identifier has been recorded, just as in the case of contents. The portable terminal has a reader function for reading data from an RFID tag, and so reads the object identifier from the RFID tag. The portable terminal transmits the read object identifier to the library information management apparatus.

The library information management apparatus records therein object information that corresponds to content information. Object information is information relating to each object. For example, when the object is a book, object information is comprised of the title, the author, the publishing company, and presentation information, which relate to the object. Just as in the embodiment, the library information management apparatus generates library list information for each user, using the object information that corresponds to the object identifier received from the portable telephone, and manages the library list information.

The user can use the library list information using a portable telephone, just as in the embodiment.

It should be noted here that, when the playback apparatus and other home servers are equipped with an RFID reader function, these devices may be designed to read an object identifier and transmit it to the library information management apparatus. In addition, two-dimensional codes (e.g. QR code) or other media may be used instead of the RFID tags.

Furthermore, in the present embodiment, a content search is performed by transmitting the title of the content to the library information management apparatus, and by searching the library list information for this title. However, it is alternatively possible to provide a content ID on the jacket of the recording medium recording the content to be searched for, in advance. In searching for this content, the content ID thereof is inputted to the portable telephone for transmission. In addition, it can be arranged to select between "search by title" and "search by content ID".

In addition, an RFID tag or a two-dimensional code may be read by a portable telephone, and be sent to the library information management apparatus, for use in finding whether the library list information has the corresponding content entry.

In addition, when using the RFID tag, if the reader of the portable telephone reads a plurality of content IDs, the portable telephone requests the library information management apparatus to find out whether the library list information has entry of each of the content IDs. Here, it is also possible, in the above case, to arrange so that the user selects content IDs that he would like to search for, and that the portable telephone requests finding of the selected content IDs.

The library information management apparatus judges whether the plurality of content IDs included in the received request have been already entered, and transmits the judgment result to the portable telephone.

The portable telephone receives the judgment result, and displays the received judgment result to the monitor. Note here that when displaying a judgment result, the portable telephone may perform display for each content ID whether the corresponding content is entered or not. Alternatively, the portable telephone may separate content IDs whose content has been already entered, from content IDs whose content has not been entered yet, and display the two kinds of content IDs separately.

(8) In the present embodiment, library list information is managed by the library information management apparatus. However, library list information may be managed by the playback apparatus, instead. In such a case, the playback apparatus reads a content ID from the BD, and acquires the content information from the library information management apparatus, thereby generating library list information. The library information management apparatus stores therein the content information, and provides it upon request of the playback apparatus, and does not perform generation of library list information. The user accesses the playback apparatus using such a terminal as portable telephone and PDA, to use the library list information. In addition, it is also possible to arrange so that the playback apparatus outputs the generated library list information to the memory card or to the portable telephone, and to make the memory card or the portable telephone manage the library list information.

In addition, it is also possible that the BD not only prestores a content, content ID and rental information, but also prestores title, title image, cast information, and presentation information, as management information for the library list information, and that the playback apparatus reads this management information from the BD, and records the management information as library list information, for example in the playback apparatus, the memory, or the portable telephone.

In addition, the playback apparatus may transmit such management information to the library information management apparatus, so that the library information management apparatus can store the received management information as library list information, and outputs it upon a user request, after processing it in the form which the user finds easy to use, by genre, or as search result.

(9) In the present embodiment, rental information has been recorded in the BD that the user has rented, and the content of the BD is entered in the library list information, as rental. However, it is also possible not to enter the content of a BD if the BD is for rent, or to enter contents of any BDs regardless of whether they are for rent.

In addition, in the present embodiment, a content is entered either when the content has not been entered yet, or when it has been entered but as rental. However, it is also possible, every time a content is played back, to transmit the entry information of the content to the library information management apparatus, for updating the library list information each time.

(10) In the present embodiment, only the open information is designed to be acquired with a user ID and a password, and the private information is acquired after acquisition of the result relating to the open information. However, the invention is not limited to such a structure, and may be as follows. The password dedicated to acquire open information and the password dedicated to acquire private information are entered in the library information management apparatus in advance. The user inputs the user ID and one of the passwords into the portable telephone, for transmission. The library information management apparatus, when the received password is the password for open information, extracts only the open information and transmits it, and when the received password is the password for private information, extracts the private information and transmits it.

(11) In the present embodiment, when receiving entry information from the playback apparatus, the library information management apparatus reads, from the content list information, the content information identified by the received content ID, and stores library list information for each user ID. However, it is possible to store only the content IDs in the library list information for a user, and, upon request for acquisition by the portable telephone, to read the requested content information and transmits it.

(12) The library information management apparatus may conduct a keyword search in the library information. In such a case, the library information management apparatus stores contents and keywords relating thereto, in association. A user inputs a keyword that he wants to search for, and transmits it to the library information management apparatus. The library information management apparatus, receiving the keyword, extracts every set that includes the keyword and outputs the set. Here, it is possible to output all the information included in the extracted set, or to output only an identifier and a title thereof.

(13) The present invention may include methods described above. In addition, the present invention may also include a computer program that realizes these methods using a computer, or may be a digital signal made up of the computer programs.

In addition, the present invention may include a computer-readable recording medium that stores therein the computer program or the digital signal, the computer readable recording medium such as a flexible disk, a hard disk, a CD-ROM, an MO, a DVD, a DVD-ROM, a DVD-RAM, a BD (Blu-ray Disc), and a semiconductor memory. Furthermore, the present invention may be the computer program or the digital signal, having been recorded in any of the aforementioned recording media.

Furthermore, the present invention may include transmitting the computer program or the digital signal via an electric communication circuit, wired/wireless communication circuits, and a network represented by the Internet.

In addition, the present invention may include a computer system equipped with a microprocessor and a memory, where the memory stores therein the computer program, and the microprocessor operates according to this computer program.

In addition, the present invention may include another or independent computer system, that is conveyed the program or the digital signal in the form of being recorded in any of the aforementioned recording media, or by transmitting the program or the digital signal via the aforementioned network and the like.

(14) The present invention may include a combination of any of the embodiments and the modification examples.

3. SUMMARY

As described above, the present invention is an information presentation system including a using device, a management device, and a portable terminal device, where the using device uses an object and transmits to the management device an object identifier identifying the object used by the using device. The management device receives and stores the object identifier, and generates presentation information based on the object identifier. According to a request from the terminal device, the management device outputs the generated presentation information, and the terminal device requests the presentation information from the management device, and presents the presentation information.

Furthermore, the present invention is a management device that makes up an information presentation system together with a using device and a terminal device, the management device including: a receiving unit operable to receive an object identifier identifying a used object from the using device; a storage unit operable to store the object identifier received by the receiving unit; a presentation-information generating unit operable to generate presentation information based on the object identifier and according to a request from the terminal device; and an outputting unit operable to output the presentation information to the terminal device.

Still further, the present invention is a using device that makes up an information presentation system together with a management device and a terminal device, the using device including: a using unit operable to use an object; an acquiring unit operable to acquire an object identifier identifying the object used by the using unit; and a transmitting unit operable to output the acquired object identifier to the management device. The management device receives and stores therein the object identifier outputted from the transmitting unit, and generates presentation information based on the stored object identifier and according to a request from the terminal device, and the terminal device requests the presentation information from the management device, and presents the presentation information.

In addition, the present invention is a portable terminal device that makes up an information presentation system together with a using device and a management device, the terminal device including: an input-receiving unit operable to receive an input from an external source; a presentation-information acquiring unit operable to acquire, according to the received input and from the management device storing therein an object identifier identifying an object used by the using device, presentation information generated based on the object identifier; and a presentation unit operable to present the acquired presentation information.

According to these structures, the user can use the presentation information without complicated operations. In addition, if carrying a terminal device with him, a user can access the information relating to the objects that the user has used, from any place such as away from home.

Here, the management device may further include an attribute-information storage unit operable to store i) a plurality of object identifiers respectively identifying a plurality of objects in association with ii) pieces of attribute information each showing attributes of a corresponding one of the plurality of objects, wherein the presentation-information generating unit generates the presentation information based on i) attribute information, from among the pieces of attribute information stored in the attribute-information storage unit, which corresponds to the received object identifier, and ii) the received object identifier.

According to this structure, the management device generates presentation information based on i) the pieces of attribute information that the device stores, and ii) the object identifiers. Therefore, if an object identifier is stored in the management device, information relating to the corresponding object may also be used.

Here, the management device may further include an extraction unit operable to extract the attribute information that corresponds to the received object identifier, from the pieces of attribute information stored in the attribute-information storage unit, where the storage unit further stores the extracted attribute information in association with the received object identifier.

According to this structure, the received object identifier is stored in association with attribute information. Therefore presentation information can be immediately generated and outputted as required, which reduces a wait time for a user in acquiring the presentation information.

Here, the management device may further include the pieces of attribute information stored in the attribute-information storage unit are grouped under a plurality of categories, the request from the terminal device includes a particular one of the categories, and the presentation information is generated based on the attribute information that includes the particular category and an object identifier corresponding to the attribute information.

According to this structure, the presentation information is generated based on attribute information. This is useful in searching for objects using attribute information.

Here, the management device may further include an attribute-information acquiring unit operable to acquire, from another device, attribute information showing attributes of an object identified by the received object identifier, where the storage unit further stores the acquired attribute information in association with the received object identifier.

According to this structure, the pieces of attribute information are acquired from another device. Therefore, the management device does not have to store the pieces of attribute information, and so the memory within the management device can be used efficiently.

Here, the management device may further be a portable recording medium connectable to the using device and to the terminal device, where the receiving unit receives the object identifier when the management device is connected to the using device, and the outputting unit outputs the presentation information when the management device is connected to the terminal device.

According to this structure, the generated presentation information is outputted to the portable terminal device. Therefore the user is able to use the presentation information generated by the management device, away from home and so on.

Here, a structure is possible in which the pieces of attribute information stored in the storage unit are grouped under a plurality of categories, the request from the terminal device including a particular one of the categories, and the presentation information is generated based on the attribute information that includes the particular category and an object identifier corresponding to the attribute information.

According to this structure, the presentation information is generated based on attribute information. This is useful in searching for objects using attribute information.

Here, a structure is possible in which the request from the terminal device includes a particular object identifier, and the presentation information shows whether the particular object identifier included in the request from the terminal device is stored in the storage unit.

In addition, the terminal device may further include an identifier-acquiring unit operable to acquire a particular object identifier identifying a particular object, where the presentation-information acquiring unit requests, from the management device, presentation information showing whether the acquired particular object identifier is stored in the management device.

According to these structures, the outputting unit outputs the result of judging as to whether the object identifier has already been recorded. Therefore the user is able to perform search as to whether the object corresponding to the object identifier has been already recorded or not. This is useful in judging whether an object was purchased or rented, for example.

Here, in the management device, it is possible to have a structure in which the request from the terminal device includes a plurality of object identifiers, and the presentation information shows, for each of the plurality of object identifiers included in the request from the terminal device, whether the object identifier is stored in the storage unit.

In addition, in the terminal device, it is possible to have a structure in which the input-receiving unit further receives input of a plurality of object identifiers, the presentation-information acquiring unit further requests the presentation information showing, for each of the plurality of object identifiers, whether the object identifier is stored in the management device, and the presentation unit further presents the presentation information in which object identifiers stored in the management device are shown in a distinguishable form from object identifiers not stored in the management device.

According to these structures, information on whether a plurality of object identifiers exist is outputted. Therefore, the user will be informed of whether the corresponding objects have already been recorded, at a time. In addition, information on each object will be presented in a distinguishable form, which will improve usability.

The management device may further includes a password storage unit operable to store a first password; and a password receiving unit operable to receive a second password from the terminal device, where the presentation-information generating unit judges whether the first password matches the second password, and when judging affirmatively, generates the presentation information.

According to these structures, the presentation information is outputted only when the two passwords have matched. Therefore it will keep away other parties who do not know about the correct password. This helps protect the privacy of the user.

The management device may further include an information storage unit operable to store position information and items of advertisement information each having a dependence on attributes of objects and positions; an attribute-information storage unit operable to store i) a plurality of object identifiers respectively identifying a plurality of objects in association with ii) pieces of attribute information each showing attributes of a corresponding one of the plurality of the objects; and a position-information acquiring unit operable to acquire position information that indicates a current position of the terminal device, where the presentation-information generating unit extracts at least one of the items of advertisement information depending on attributes corresponding to the received object identifier and the acquired position information, and sets the extracted item of advertisement information as the presentation information.

According to this structure, advertisement information can be transmitted in accordance with the information on a current position-of the user, who is holding the terminal device, and the attributes of the objects having been used by the user. This is advantageous for the transmitting party because the advertisement effect heightens, as well as for the user because he can acquire useful information.

Here, the using device may further include the acquiring unit acquires the object identifier by receiving an input from a user of the using device.

In addition, in the using device, it is possible to have a structure in which the object identifier is stored in a recording medium assigned to the object, and the acquiring unit acquires the object identifier from the recording medium.

According to these structures, even when objects are books, sundry articles, or the like, the object identifiers which correspond to objects having been used by the user, can be recorded by a simple operation of either 1) inputting of_each object identifier or 2) reading of such an identifier from the recording medium.

Here, the recording medium may be an RFID tag.

In addition, in the terminal device, it is possible to have a structure in which the particular object identifier is recorded in an RFID tag assigned to the particular object, and the identifier-acquiring unit acquires the particular object identifier from the RFID tag.

According to these structures, object identifiers can be read through RFID tags. Therefore the user can easily access the presentation information, without complicated operations such as inputting of such object identifier.

Here, in the terminal device, the identifier-acquiring unit has a function of reading a plurality of object identifiers from a plurality of RFID tags, the presentation-information acquiring unit acquires the presentation information showing, for each of the plurality of object identifiers, whether the object identifier is stored in the management device, and the presentation unit presents the presentation information in which object identifiers stored in the management device are shown in a distinguishable form from object identifiers not stored in the management device.

According to this structure, the user can conduct a search as to whether a plurality of objects have been entered or not, at a time. In addition, shops and the like generally have varieties of commodities, including the objects. Use of RFID is useful if used in such shops, because use of RFID enables the terminal device to read the plurality of object identifiers at once, by one control for the terminal device. This eliminates the trouble of taking out a plurality of objects one by one in an attempt to input the object identifiers.

Here, the recording medium may be a two-dimensional code.

In addition, in the terminal device, it is possible to have a structure in which the particular object identifier is recorded in a two-dimensional code assigned to the particular object, and the identifier acquiring unit acquires the particular object identifier from the two-dimensional code.

According to these structures, object identifiers can be read through two-dimensional codes. Therefore the user can use the presentation information, without complicated operations such as inputting.

In addition, the present invention is a management device that makes up an information presentation system together with a terminal device, the management device including: a using unit operable to use an object; an acquiring unit operable to acquire an object identifier identifying the object used by the using unit; a storage unit operable to store the acquired object identifier; a presentation-information generating unit operable to generate presentation information based on the object identifier stored in the storage unit and according to a request from the terminal device; and an outputting unit operable to output the presentation information to the terminal device.

According to this structure, at the time when a content is played back, the corresponding content identifier is acquired from the recording medium. This means that, without complicated operations, the user can record the object identifiers that correspond to contents that the user has used, only by using the content.

Here, in the management device, it is possible to have a structure in which the object is a digital content, the use performed by the using unit is to play back the digital content, the digital content and the object identifier are stored in a portable recording medium, where the recording medium further recording therein attribute information showing attributes of the digital content, the acquiring unit further acquires the attribute information from the recording medium, the storage unit further stores therein the acquired attribute information in association with the object identifier, and the presentation-information generating unit generates the presentation information based on the object identifier and the attribute information that is stored in association with the object identifier in the storage unit.

According to this structure, attribute information is acquired from a recording medium. This means that only the management device is necessary for recording the object identifier. Therefore, another apparatus or operation for communicating with the other apparatus is unnecessary. This also helps prevent increase in cost, as a system.

Here, in the management device, it is possible to have a structure in which the object identifier is stored in a recording medium assigned to the object, and the acquiring unit acquires the object identifier from the recording medium.

According to these structures, the use object identifiers, which correspond to objects having been used by the user, can be recorded by a simple operation of reading of such an identifier from the recording medium.

Here, in the management device, it is possible to have a structure in which an attribute-information acquiring unit operable to acquire attribute information showing attributes of the object identified by the acquired object identifier, where the storage unit further stores therein the acquired attribute information in association with the object identifier.

According to this structure, it becomes also possible to use attribute information showing attributes of the object.

The present invention may be used managerially, repeatedly, and continuously, in the software industry providing software such as contents and computer programs in which copyrighted works such as movie and music are digitalized. Furthermore, the library information management apparatus and the memory card, of the present invention, may be produced and sold in the manufacturing industry of electric appliances or the like.

The invention claimed is:

1. An information presentation system comprising:
   a playback device;
   a management device; and
   a terminal device, wherein
   said terminal device is a different entity from said playback device,
   said playback device plays back a content, obtains (i) a content identifier that identifies the content having been played back by said playback device, and (ii) rental information that shows whether or not the content is a rental content, and transmits the content identifier and the rental information to the management device, and
   the management device including:
   a storage unit operable to store a content identifier that identifies a content having been played back in a past by the playback device in association with rental information that shows whether or not the content is a rental content;
   a receiving unit operable to receive, from the playback device, (i) a new content identifier that identifies a new content having newly been played back by the playback device and (ii) new rental information that shows whether or not the new content is a rental content;
   an update unit operable to
   (i) perform an update on the stored rental information so as to show that the content is not the rental content when (a) the received new content identifier and the stored content identifier identify a same content, and (b) the stored rental information shows that the content is the rental content, and the received new rental information shows that the new content is not the rental content,
   (ii) perform no update on the stored rental information regardless of whether or not the received new rental information shows that the new content is the rental content when (a) the received new content identifier and the stored content identifier identify the same content, and (b) the stored rental information shows that the content is not the rental content, and (iii) store the new content identifier and the new rental information to the storage unit, when the received new content identifier and the stored content identifier identify different contents from each other;

a generation unit operable to generate presentation information using the stored content identifier and the stored rental information in response to a request from the terminal device; and an output unit operable to output the presentation information to the terminal device, and the terminal device makes the request to the management device to generate the presentation information, obtains the presentation information from said management device, and presents the presentation information.

2. A management device included in an information presentation system together with a playback device and a terminal device, the terminal device being a different entity from the playback device, and the management device comprising:

a storage unit operable to store a content identifier that identifies a content having been played back in a past by the playback device in association with rental information that shows whether or not the content is a rental content;

a receiving unit operable to receive, from the playback device, (i) a new content identifier that identifies a new content having newly been played back by the playback device and (ii) new rental information that shows whether or not the new content is a rental content;

an update unit operable to (i) perform an update on the stored rental information so as to show that the content is not the rental content when (a) the received new content identifier and the stored content identifier identify a same content, and (b) the stored rental information shows that the content is the rental content, and the received new rental information shows that the new content is not the rental content, (ii) perform no update on the stored rental information regardless of whether or not the received new rental information shows that the new content is the rental content when (a) the received new content identifier and the stored content identifier identify the same content, and (b) the stored rental information shows that the content is not the rental content, and (iii) store the new content identifier and the new rental information to the storage unit, when the received new content identifier and the stored content identifier identify different contents from each other;

a generation unit operable to generate presentation information using the stored content identifier and the stored rental information in response to a request from the terminal device; and an outputting unit operable to output the presentation information to the terminal device.

3. The management device of claim 2, wherein
said generation unit includes:
an information storage unit operable to store therein a plurality of content identifiers in association with attribute information related to the plurality of content identifiers respectively identifying a plurality of content and the attribute information indicating attributes for corresponding content; and
an information generating unit operable to generate the presentation information, in response to the request from the terminal device, using (i), from among the stored attribute information, attribute information which corresponds to the stored content identifier, (ii) the stored content identifier and (iii) the stored rental information.

4. The management device of claim 3, wherein
said information generating unit includes:
an attribute-information extraction unit operable to extract the attribute information corresponding to the stored content identifier stored in the storage unit from among a plurality of attribute information;
an attribute-information write unit operable to write to said storage unit, library information including the extracted attribute information, the stored content identifier and the stored rental information; and
a presentation-information generating unit operable to generate the presentation information using the library information written to said storage unit.

5. The management device of claim 4, wherein
the attribute information stored in said information storage unit are grouped under a plurality of categories,
the request from the terminal device includes a particular one of the categories, and
said information generating unit generates the presentation information using attribute information belonging to the particular one of the categories and a content identifier and rental information corresponding to the attribute information.

6. The management device of claim 4, wherein
said receiving unit further receives a user identifier that identifies a user who played back the new content, together with the reception of the new content identifier and the new rental information,
said storage unit stores one or more library list information, each library list information including a user identifier in association with one or more library information,
the request from the terminal device includes a particular user identifier, and
said generation unit generates the presentation information based on the library list information corresponding to the particular user identifier, the library list information being library list information stored in said storage unit.

7. The management device of claim 2, wherein
said receiving unit further receives a user identifier identifying a user who played back the new content, together with the reception of the new content identifier and the new rental information,
the storage unit stores therein the content identifier and the rental information in association with a user identifier,
the request from the terminal device includes a particular user identifier, and
said generation unit generates the presentation information based on a content identifier and rental information stored in association with the particular user identifier.

8. The management device of claim 2, wherein
said generation unit includes:
an attribute-information acquiring unit operable to acquire, from another device, attribute information indicating attributes of a content identified by the received new content identifier;
an attribute-information write unit operable to write to said storage unit, library information including the acquired attribute information, the received new content content identifier and the received new rental information; and
a presentation-information generating unit operable to generate the presentation information using library information written to said storage unit.

9. The management device of claim 8, wherein the management device is a portable recording medium connectable to the playback device and to the terminal device, wherein
said receiving unit receives the new content identifier and the new rental information when the management device is connected to the playback device, and
said outputting unit outputs the presentation information when the management device is connected to the terminal device.

10. The management device of claim 8, wherein
attribute information stored in said storage unit is grouped under a plurality of categories,
the request from the terminal device includes a particular one of the categories, and
said generating unit generates the presentation information using attribute information belonging to the particular one of the categories and a content identifier corresponding to attribute information and rental information.

11. The management device of claim 2, wherein
the request from the terminal device includes a particular content identifier, and
said generation unit generates the presentation information indicating whether the particular content identifier is stored in said storage unit.

12. The management device of claim 11, wherein
the request from the terminal device includes a plurality of content identifiers, and
said generation unit generates the presentation information indicating, for each of the content identifiers, whether the content identifier is stored in said storage unit.

13. The management device of claim 2, wherein
said generation unit includes:
a password storage unit operable to store therein a first password;
a password receiving unit operable to receive a second password from the terminal device, and wherein
a presentation-information generating unit judges whether the first password matches the second password, and when judging affirmatively, generates the presentation information using the content identifier and the rental information stored in said storage unit in response to the request from the terminal device.

14. A management method used in a management device that is included in an information presentation system together with a playback device and a terminal device, the terminal device being a different entity from the playback device, and the management device including a storage unit storing therein a content identifier that identifies a content having been played backed in a past by the playback device in association with rental information that shows whether or not the content is a rental content, the management method comprising:
a receiving step of receiving at a receiving unit and from the playback device (i) a new content identifier that identifies a new content having newly been played back by the playback device and (ii) new rental information that shows whether or not the new content is a rental content;
an updating step at an updating unit of
(i) performing an update on the stored rental information so as to show that the content is not the rental content when (a) the received new content identifier and the stored content identifier identify a same content, and (b) the stored rental information shows that the content is the rental content, and the received new rental information shows that the new content is not the rental content,
(ii) performing no update on the stored rental information regardless of whether or not the received new rental information shows that the new content is the rental content when (a) the received new content identifier and the stored content identifier identify the same content, and (b) the stored rental information shows that the content is not the rental content, and
(iii) storing the new content identifier and the new rental information to the storage unit, when the received new content identifier and the stored content identifier identify different contents from each other;
a generation step of generating at a generation unit presentation information using the stored content identifier and the stored rental information in response to a request from the terminal device; and
an outputting step of outputting from an outputting unit the presentation information to the terminal device via an outputting unit.

15. A computer-readable recording medium on which a management program is stored, the management program being for use in a management device included in an information presentation system together with a playback device and a terminal device, the terminal device being a different entity from the playback device, the management device including a storage unit storing therein a content identifier that identifies a content having been played back by the playback device in association with rental information the shows whether the content is a rental content or not, and the management program causing a computer to perform the following:
a receiving step of receiving, from the playback device, (i) a new content identifier, that identifies a new content having newly been played back, from the playback device and (ii) new rental information that shows whether or not the new content is a rental content;
an updating step of
(i) performing an update on the stored rental information so as to show that the content is not the rental content when (a) the received new content identifier and the stored content identifier identify a same content, and (b) the stored rental information shows that the content is the rental content, and the received new rental information shows that the new content is not the rental content,
(ii) performing no update on the stored rental information regardless of whether or not the received new rental information shows that the new content is the rental content when (a) the received new content identifier and the stored content identifier identify the same content, and (b) the stored rental information shows that the content is not the rental content, and
(iii) storing the new content identifier and the new rental information to the storage unit, when the received new content identifier and the stored content identifier identify different contents from each other;
a generation step of generating presentation information using the stored content identifier and the stored rental information in the storage unit in response to a request from the terminal device; and
an outputting step of outputting the presentation information to the terminal device via an outputting unit.

16. A playback device that is used together with a management device, the playback device comprising:
a playback unit operable to play back a content recorded in a recording medium;
an acquiring unit operable, when the content has been played back, to acquire from the recording medium (i) a content identifier that identifies the content having been played back by the playback unit; and (ii) rental information that shows whether or not the content is a rental content;

a storage unit operable to store a content identifier and rental information, which have been transmitted in a past to the management device, the management device managing the content identifier and the rental information transmitted from the playback device;

a transmission unit operable to (i) transmit the acquired content identifier and the acquired rental information to the management device, when (a) the acquired content identifier and the stored content identifier identify the same content, and (b) the stored rental information shows that the content is the rental content, and the acquired rental information shows that the content is not the rental content, (ii) suppress transmitting of the acquired content identifier and the acquired rental information to the management device, when (a) the acquired content identifier and the stored content identifier identify the same content, and (b) the stored rental information shows that the content is not the rental content, (iii) transmit the acquired content identifier and the acquired rental information to the management device when the acquired content identifier and the stored content identifier identify different contents from each other; and an updating unit operable to update the storing unit to store the acquired content identifier and the acquired rental information, when the transmission unit transmits the acquired content identifier and the acquired rental information to the management device.

17. A playback method used in a playback device that is used together with a management device, the playback method comprising:

a playback step of playing back a content recorded in a recording medium;

an acquiring step of, when the content has been played back, acquiring from the recording medium (i) a content identifier that identifies the content having been played back by the playback unit; and (ii) rental information that shows whether or not the content is a rental content;

a storage step of storing a content identifier and rental information, which have been transmitted in a past to the management device, the management device managing the content identifier and the rental information transmitted from the playback device;

a transmission step of (i) transmitting the acquired content identifier and the acquired rental information to the management device, when (a) the acquired content identifier and the stored content identifier identify the same content, and (b) the stored rental information shows that the content is the rental content, and the acquired rental information shows that the content is not the rental content, (ii) suppressing transmitting of the acquired content identifier and the acquired rental information to the management device, when (a) the acquired content identifier and the stored content identifier identify the same content, and (b) the stored rental information shows that the content is not the rental content, (iii) transmitting the acquired content identifier and the acquired rental information to the management device when the acquired content identifier and the stored content identifier identify different contents from each other; and an update step of updating the storing unit to store the acquired content identifier and the acquired rental information, when the transmission unit transmits the acquired content identifier and the acquired rental information to the management device.

18. A computer-readable recording medium on which a playback program is stored, the playback program being used in a playback device that is used together with a management device, and the playback program causes the playback device to perform:

a playback step of playing back a content recorded in a recording medium;

an acquiring step of, when the content has been played back, acquiring from the recording medium (i) a content identifier that identifies the content having been played back by the playback unit; and (ii) rental information that shows whether or not the content is a rental content;

a storage step of storing a content identifier and rental information, which have been transmitted in a past to the management device, the management device managing the content identifier and the rental information transmitted from the playback device;

a transmission step of (i) transmitting the acquired content identifier and the acquired rental information to the management device, when (a) the acquired content identifier and the stored content identifier identify the same content, and (b) the stored rental information shows that the content is the rental content, and the acquired rental information shows that the content is not the rental content, (ii) suppressing transmitting of the acquired content identifier and the acquired rental information to the management device, when (a) the acquired content identifier and the stored content identifier identify the same content, and (b) the stored rental information shows that the content is not the rental content, (iii) transmitting the acquired content identifier and the acquired rental information to the management device when the acquired content identifier and the stored content identifier identify different contents from each other; and an update step of updating the storing unit to store the acquired content identifier and the acquired rental information, when the transmission unit transmits the acquired content identifier and the acquired rental information to the management device.

* * * * *